US008966967B2

(12) United States Patent
Wiebrecht et al.

(10) Patent No.: US 8,966,967 B2
(45) Date of Patent: Mar. 3, 2015

(54) SYSTEM AND METHOD FOR DETERMINING A HEALTH OF A BEARING OF A CONNECTING ROD

(71) Applicant: Caterpillar Inc., Peoria, IL (US)

(72) Inventors: Eric D. Wiebrecht, East Peoria, IL (US); Colin P. Garner, Loughborough (GB); Andrew M. Williams, Loughborough (GB); Michael Gore, Daventry (GB)

(73) Assignee: Caterpillar Inc., Peoria, IL (US)

( * ) Notice: Subject to any disclaimer, the term of this patent is extended or adjusted under 35 U.S.C. 154(b) by 20 days.

(21) Appl. No.: 13/889,486

(22) Filed: May 8, 2013

(65) Prior Publication Data

US 2014/0331753 A1 Nov. 13, 2014

(51) Int. Cl.
| | | |
|---|---|---|
| *G01M 15/04* | (2006.01) | |
| *G01M 13/04* | (2006.01) | |
| *F02D 41/22* | (2006.01) | |
| *G01M 15/06* | (2006.01) | |
| *F16C 9/02* | (2006.01) | |
| *G01M 3/04* | (2006.01) | |

(52) U.S. Cl.
CPC ............... *G01M 13/04* (2013.01); *F02D 41/22* (2013.01); *G01M 15/06* (2013.01); *F16C 9/02* (2013.01); *G01M 3/04* (2013.01)
USPC ..................................................... 73/114.81

(58) Field of Classification Search
CPC .......... F16C 9/02; G01M 13/04; G01M 15/06
USPC ....................................................... 73/114.81
See application file for complete search history.

(56) References Cited

U.S. PATENT DOCUMENTS

| | | | | |
|---|---|---|---|---|
| 3,246,640 | A * | 4/1966 | Wagner et al. ............ | 123/198 R |
| 4,878,761 | A | 11/1989 | Duehrkoop | |
| 5,331,311 | A | 7/1994 | Doctor | |
| 5,730,097 | A * | 3/1998 | Aoyama ................... | 123/196 R |
| 6,312,226 | B1 | 11/2001 | Senior, Jr. et al. | |
| 6,446,497 | B1 * | 9/2002 | Glaser et al. ............... | 73/114.57 |
| 6,561,121 | B1 * | 5/2003 | Rose .............................. | 116/216 |
| 6,637,932 | B2 * | 10/2003 | Badeer .......................... | 374/141 |
| 6,658,926 | B2 * | 12/2003 | Mairhofer .................. | 73/114.42 |
| 6,684,690 | B2 * | 2/2004 | Mairhofer .................. | 73/114.81 |
| 6,964,518 | B1 * | 11/2005 | Jagtøyen ....................... | 374/154 |
| 7,631,553 | B2 * | 12/2009 | Heim et al. ................ | 73/115.07 |
| 7,769,564 | B2 | 8/2010 | Church | |
| 7,954,363 | B2 * | 6/2011 | Friis-Knudsen ............ | 73/114.57 |
| 2006/0131464 | A1 * | 6/2006 | Hesser et al. .............. | 246/169 D |
| 2007/0017280 | A1 * | 1/2007 | Scull ............................... | 73/116 |

FOREIGN PATENT DOCUMENTS

| | | |
|---|---|---|
| GB | 2155678 | 9/1985 |
| JP | 2009254163 | 10/2009 |
| WO | 9940401 | 8/1999 |

* cited by examiner

*Primary Examiner* — Freddie Kirkland, III

(57) ABSTRACT

A system for determining a health of a bearing associated with a connecting rod is provided. The system includes a sensor associated with the connecting rod and remotely disposed relative to the bearing of the connecting rod. The sensor is configured to generate a signal indicative of a temperature of the bearing. The system includes a controller communicably coupled to the sensor. The controller is configured to receive the signal indicative of the temperature of the bearing. The controller further determines a health of the bearing as a function of the signal of the temperature of the bearing.

20 Claims, 4 Drawing Sheets

SYSTEM AND METHOD FOR DETERMINING A HEALTH OF A BEARING OF A CONNECTING ROD

TECHNICAL FIELD

The present disclosure relates to a system and method for determining a health of a bearing of a connecting rod, and more specifically for detecting a failure of the bearing of the connecting rod.

BACKGROUND

A reciprocating internal combustion (IC) engine may include a connecting rod-crankshaft assembly including a bearing provided at a fork end of the connecting rod. This type of arrangement allows for rotation of the crankshaft within the fork end of the connecting rod. The bearing forms a critical component of the connecting rod-crankshaft assembly.

During operation of the engine, the bearing may undergo considerable friction. The friction may cause an increase in operating temperature of the bearing. In some situations, the increase in the operating temperature of the bearing may rise above a permissible threshold or faster than a permissible rate, causing over heating leading to failure of the bearing. Failure of the bearing in turn may cause irreparable damage to the connecting rod-crankshaft assembly, and may sometimes lead to a complete failure of the engine.

Methods to determine the temperature of the bearing are known in the art. For example, WO Patent Number 9,940,401 discloses a thermoelement for controlling a temperature in a region of a bearing of a machine part, especially an engine connecting rod or a crankshaft, the machine part being composed of an electroconducting material. The thermoelement has an electrical connection line which is provided on the machine part. An end of the electrical connection line, which is closer to the bearing than the other end is connected to the machine part in an electroconducting manner so as to form a closed electrical circuit. The end closest to the bearing is composed, at least at the connecting point, of an electroconducting material which is different from the machine part material.

Known systems may have a complex construction requiring drilling of channels and bores within the system in order to house temperature sensing elements and related components in connection with the connecting rod. The drilled channels and bores may tend to increase fatigue failures of the connecting rod. Additionally, the manufacturing process of the connecting rod may be overly laborious and expensive. In systems where the temperature sensing elements may be directly mounted on a moving part, the temperature sensing elements may fail prematurely due to mechanical damages.

SUMMARY OF THE DISCLOSURE

In one aspect of the disclosure, a system includes a bearing associated with a connecting rod. The system includes a sensor associated with the connecting rod and remotely disposed relative to the bearing of the connecting rod. The sensor is configured to generate a signal indicative of a temperature of the bearing. The system includes a controller communicably coupled to the sensor. The controller is configured to receive the signal indicative of the temperature of the bearing. The controller further determines a health of the bearing as a function of the signal of the temperature of the bearing.

In another aspect of the disclosure a method includes providing a sensor associated with the connecting rod. The sensor is remotely disposed relative to the bearing of the connecting rod. The method includes generating, by the sensor, a signal indicative of a temperature of the bearing. The method includes receiving, by a controller, the signal indicative of the temperature of the bearing. The method further includes determining, by the controller, a health of the bearing as a function of the signal of the temperature of the bearing.

In yet another aspect, the disclosure provides an engine housing. The engine housing includes a cylinder head. The engine housing includes an engine block having a cylinder. The engine housing includes a connecting rod and a bearing associated with the connecting rod. The engine housing includes a sensor associated with the connecting rod and remotely disposed relative to the bearing of the connecting rod. The sensor is configured to generate a signal indicative of a temperature of the bearing. The engine housing further includes a controller communicably coupled to the sensor. The controller is configured to receive the signal indicative of the temperature of the bearing. The controller further determines a health of the bearing as a function of the signal of the temperature of the bearing.

DETAILED DESCRIPTION

Reference will now be made in detail to specific embodiments or features, examples of which are illustrated in the accompanying drawings. Generally, corresponding or similar reference numbers will be used, when possible, to refer to the same or corresponding parts.

Figure 1:
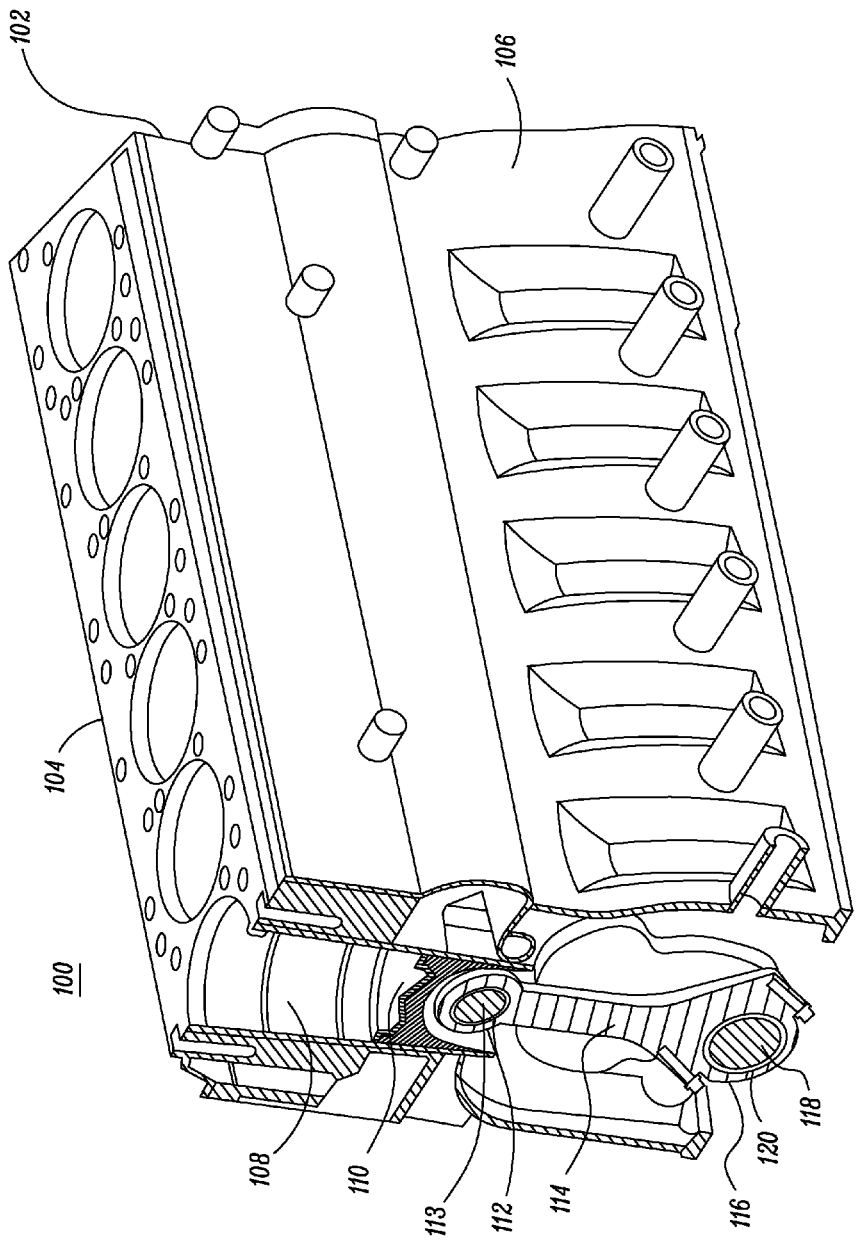
FIG. 1 illustrates an exemplary engine having an engine housing including a connecting rod and a bearing associated with the connecting rod.

Referring now to FIG. 1, an exemplary engine 100 is illustrated. More specifically, the engine 100 is a multi cylinder IC engine. The engine 100 may be powered by any one or a combination of known liquid or gaseous fuels including, but not limited to, gasoline, diesel, natural gas, petroleum gas and bio-fuels.

The engine 100 may include an engine housing 102. The engine housing 102 may include a cylinder head 104 and an engine block 106. The engine block 106 may include a plurality of cylinders 108. Each of the plurality of the cylinders 108 may be configured for housing a piston 110. The piston 110 may be configured to have a translatory movement within the cylinder 108. The piston 110 may be coupled to an eye end 112 of a connecting rod 114 by a gudgeon pin 113. A fork end 116 of the connecting rod 114 may be coupled to a crankshaft 118. The connecting rod 114 may be configured to convert the translatory movement of the piston 110 to a rotary movement of the crankshaft 118. A bearing 120 may be provided at the fork end 116 to allow rotation of the crankshaft 118 within the fork end 116 of the connecting rod 114.

Figure 2:
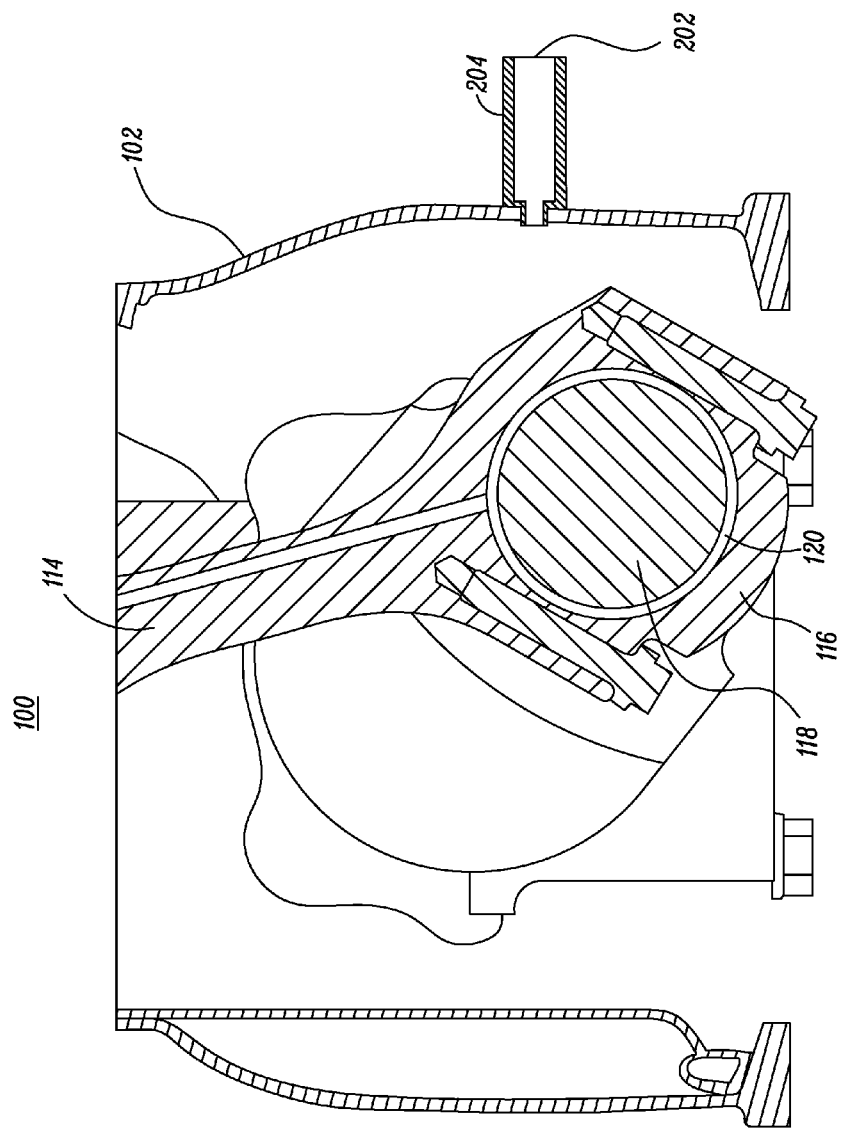
FIG. 2 illustrates a cross sectional view of an exemplary engine with a sensor provided on the engine housing.

Referring now to FIG. 2, a sensor 202 may be remotely disposed relative to the bearing 120 of the connecting rod 114. In the illustrated embodiment, the sensor 202 is mounted, on the engine housing 102, proximate to and in association with the connecting rod 114. As illustrated, the sensor 202 is mounted proximate to the fork end 116 of the connecting rod 114 on a downstroke side of the connecting rod 114. In some embodiments, a plurality of the sensors 202 may be provided on any one or both of the downstroke side and an upstroke side of the plurality of the connecting rods 114, in any desired combination.

The sensor 202 may be configured to remotely generate a signal indicative of a temperature of the bearing 120. Accordingly, the sensor 202 may be any non-contact type sensor for temperature measurement. For example, the sensor 202 may be an infrared sensor. Alternatively, any other non-contact type sensor known in the art may also be utilized as per system design, requirements and compatibility. The sensor 202 may be mounted on and affixed to the engine housing 102 by any known mechanical fastening methods including, but not limited to, welding, bolting, riveting, snapping and clamping. In one embodiment, threads may be provided on a body 204 of the sensor 202 to enable the sensor 202 to be directly screw fitted on the engine housing 102.

Figure 3:
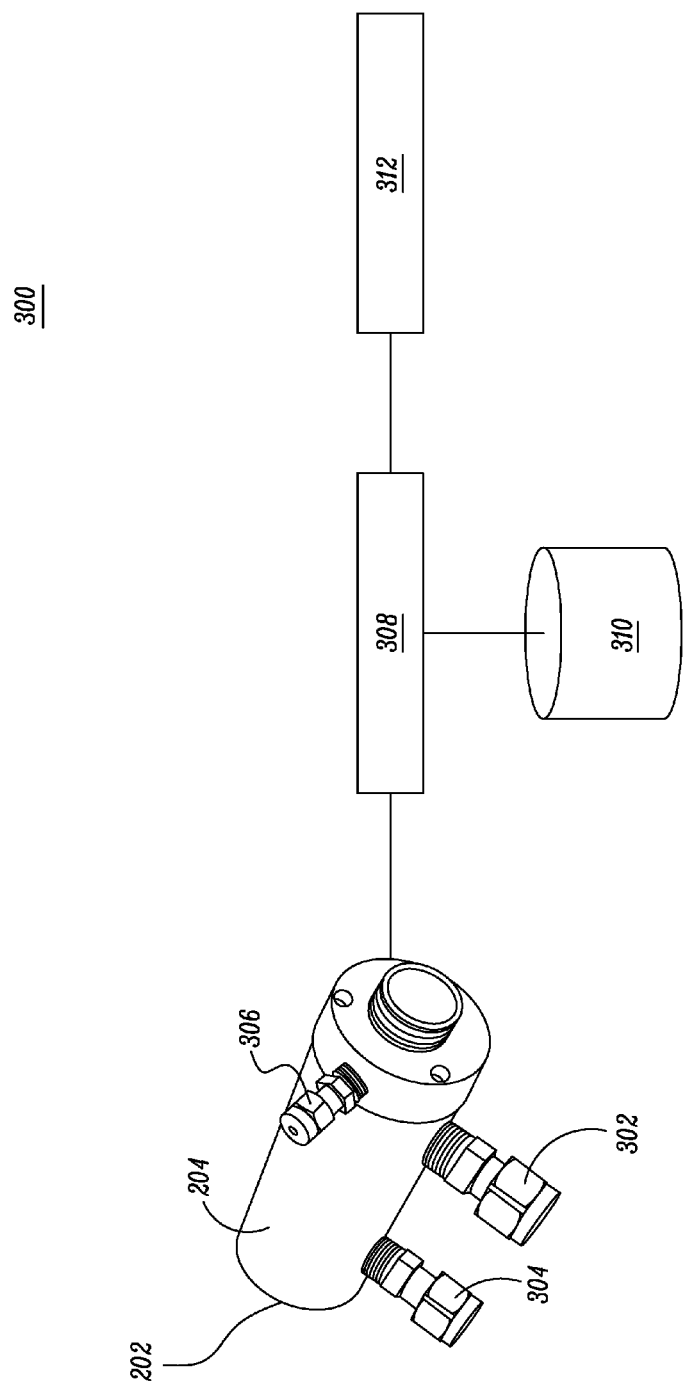
FIG. 3 illustrates a block diagram of an exemplary health determination system for the bearing.

Since the sensor 202 is positioned on the engine housing 102, the sensor 202 may be subjected to extreme temperatures. This may lead to increase in a temperature of the sensor 202 beyond an acceptable operating temperature range for the sensor 202. As a result, the sensor 202 may fail to perform satisfactorily. In one embodiment, as shown in FIG. 3, a cooling arrangement may be optionally provided for the sensor 202. The body 204 may be provided on the sensor 202 to house one or more elements of the sensor 202. An inlet port 302 may be provided on the body 204 of the sensor 202. Cooling air or any other suitable coolant may be introduced inside the body 204 of the sensor 202 through the inlet port 302. The cooling air may flow through a cooling circuit inside the body 204 of the sensor 202. In doing so, the cooling air may receive excess heat present in the sensor 202. After receiving the excess heat, the cooling air may exit the body 204 through an outlet port 304 provided on the body 204 of the sensor 202. The cooling arrangement may prevent increase in the temperature of the sensor 202 beyond the acceptable operating temperature range.

During the downstroke and upstroke movement of the connecting rod 114, oil present in and around the fork end 116 may be cast off from a surface of the connecting rod 114. Since the sensor 202 may be positioned proximate to the fork end 116 of the connecting rod 114, at least a portion of the oil cast off may be sprayed on the sensor 202. The oil cast off may further contact a lens (not shown) of the sensor 202 present inside the body 204 of the sensor 202. As a result, the sensor 202 may generate incorrect temperature readings. Accordingly, an air curtain port 306 may be optionally provided on the body 204 of the sensor 202 adjacent to the lens of the sensor 202. The air curtain port 306 may be configured to create a layer of pressurized air in front of the lens of the sensor 202. The layer of pressurized air may prevent the oil cast off from the surface of the connecting rod 114 from contacting the lens of the sensor 202.

Referring now to FIG. 3, a health determination system 300 for the bearing 120 is illustrated. The health determination system 300 may include a controller 308 communicably coupled to the sensor 202. The controller 308 may be configured to receive the signal indicative of the temperature of the bearing 120 of the connecting rod 114, from the sensor 202. The controller 308 may be configured to determine the health of the bearing 120 as a function of the signal indicative of the temperature of the bearing 120 of the connecting rod 114. In one embodiment. In one embodiment, the controller 308 may be configured to compare the temperature of the bearing 120 with a predetermined threshold. Based on the comparison made, the controller 308 may be configured to determine the health of the bearing 120. More specifically, the controller 308 may be configured to detect if the temperature of the bearing 120 exceeds the predetermined threshold, in order to determine an impending failure of the bearing 120. In other exemplary embodiments, the controller 308 may be configured to determine the health of the bearing 120 as a function of the rate of change of temperature of the bearing 120, or the second derivative of the temperature of the bearing 120. In another exemplary embodiment the controller 308 may be configured to determine the health of the bearing 308 with a predictive bearing failure, life, and/or wear model included in a controller 308 memory (not shown).

In one embodiment, the predetermined threshold may be an average temperature of the bearings 120 of each of the plurality of other connecting rods 114 in the engine 100. In such an embodiment, the controller 308 may be configured to receive signals from each of the plurality of the sensors 202 associated with the corresponding connecting rod 114. Based on these signals, the controller 308 may be further configured to determine the average temperature of the bearings 120 of the plurality of the connecting rods 114.

The controller 308 may then compare the determined average temperature to that of the signal generated by the sensor 202 associated with the bearing 120 of the given connecting rod 114. One of ordinary skill in the art will appreciate that recording and monitoring of the signals from each of the sensors 202 and/or computation of the average temperature may be done on a real time basis. Alternatively, the system 300 may be activated at regular intervals to determine the health of the bearings 120. In yet another situation, the system 300 may be manually activated based on an input received from an operator through an operator control panel. Another variation may include activation of the system 300 based on reaching certain engine parameter characteristics.

In another embodiment, the predetermined threshold may be a pre-calibrated dataset or temperature map stored in a database 310. The database 310 may be any conventional or non-conventional database known in the art. The database 310 may be intrinsic or extrinsic to the engine 100. The pre-calibrated dataset may store one or more temperature values based on one or more parameters of the engine 100. For example, the dataset may include a map or a table containing a set of threshold limits of allowable bearing temperature readings or a rate of change of temperature readings corresponding to different operational speeds of the engine 100. In this situation, the controller 308 may compare the signal received from the sensor 202, which is indicative of the temperature of the bearing 120 associated with the connecting rod 114, with that of the data retrieved from the database 310.

A possible failure condition of any one or more bearings 120, the temperature of the respective failed bearing 120 may increase considerably, due to excessive friction, with respect to other bearings 120. As a result, the temperature of the failed bearing 120 may also increase. This increase in temperature may be detected by the controller 308 based on the comparison of the determined average temperature with the temperature of the given bearing 120. More specifically, when the temperature of the bearing 120 exceeds the average temperature, the controller 308 may detect an impending failure of the bearing 120 or a tendency of failure of the bearing 120.

In another embodiment, the controller 308 may monitor and maintain a log of the bearing temperatures of each of the plurality of the bearings 120 over a course of time or multiple operational cycles. These logs may be stored in the database

310. For example, on installation of a new set of bearings 120 or at the beginning of a new service cycle, the controller 308 may monitor and record the temperature of the bearing 120. Over various operational cycles of the bearing 120, the bearing 120 may be subjected to wear and tear. Frictional forces acting on the bearing 120 may lead to an increase in the temperature of the bearing 120. In a situation in which a set of bearings 120 are present in the system, over the course of time, the average temperature of the bearings 120 may rise. Accordingly, the controller 308 may detect the tendency of failure of the set of the bearings 120 by detecting when the temperature of each of the bearings 120 exceeds the predetermined threshold. In other exemplary embodiments the controller 308 may be configured to determine the health of the bearing 120 as a function of the rate of change of temperature of the bearing 120, or the second derivative of the temperature of the bearing 120.

A variety of outputs may be provided by the system 300 in order to notify the operator of the engine 100 or a machine including the engine 100, or to take remedial action in case of detection of the tendency of the failure of the bearing 120. In one embodiment, the controller 308 may be communicably coupled to a display device 312. Based on the determination of the health of the bearing 120, the controller 308 may be configured to notify the operator of the determined health of the bearing 120. The controller 308 may be configured to display visual indications to notify the operator of the determined health of the bearing 120. These visual indications may include, but may not be limited to, any one or a combination of colored icons, text messages and/or numerical values denoting service cycle due, health and/or failure of any one or more of the plurality of the bearings 120, remaining operable life and/or end of operable life of any one or more of the plurality of the bearings 120.

In one embodiment, prior to the detection of the tendency of the failure of the bearing 120, the controller 308 may display a notification indicative of a good health of the bearing 120 in the form of a relevant visual indication, like the text message or the colored icon. When the controller 308 may detect the tendency of the failure of the bearing 120, the controller 308 may change the notification displayed on the display device 312 to make the operator aware of the change in the health status of the bearing 120. For example, contents of the text message or color of the icon may be appropriately changed.

Alternatively, the outputs provided by the system 300 may include remedial actions based on the detection of the tendency of the failure of the bearing 120. In one embodiment, on the detection of the impending failure of the bearing 120, the controller 308 may be configured to shut off a fuel supply to the engine 100 or the cylinder 108 associated with the respective failed bearing 120. In another embodiment, the controller 308 may be configured to restrict a power output of the engine 100 to a predetermined value until it may be possible to stop the engine 100 based on a completion of an ongoing task.

The controller 308 may embody a single microprocessor or multiple microprocessors that includes a means for receiving signals from the components of the health determination system 300. Numerous commercially available microprocessors may be configured to perform the functions of the controller 308. It should be appreciated that the controller 308 may readily embody a general machine microprocessor capable of controlling numerous machine functions. A person of ordinary skill in the art will appreciate that the controller 308 may additionally include other components and may also perform other functionality not described herein. It should be understood that the embodiments and the configurations and connections explained herein are merely on an exemplary basis and may not limit the scope and spirit of the disclosure.

INDUSTRIAL APPLICABILITY

The bearing of the connecting rod is a critical component of the connecting rod-crankshaft assembly. Due to continuous friction during operation of the engine, the bearing tends to wear out. A worn out bearing is more prone to failure which in turn may damage and cause failure of the connecting rod-crankshaft assembly and the engine. Detecting the health and/or the tendency of failure of the bearing may enable in preventing catastrophic failure of the bearing and associated components.

The health of the bearing may be determined by detecting and/or monitoring the temperature of the bearing, during movement of the connecting rod. It should be noted that the health of the bearing may be determined based on a function of the temperature of the bearing.

Figure 4:
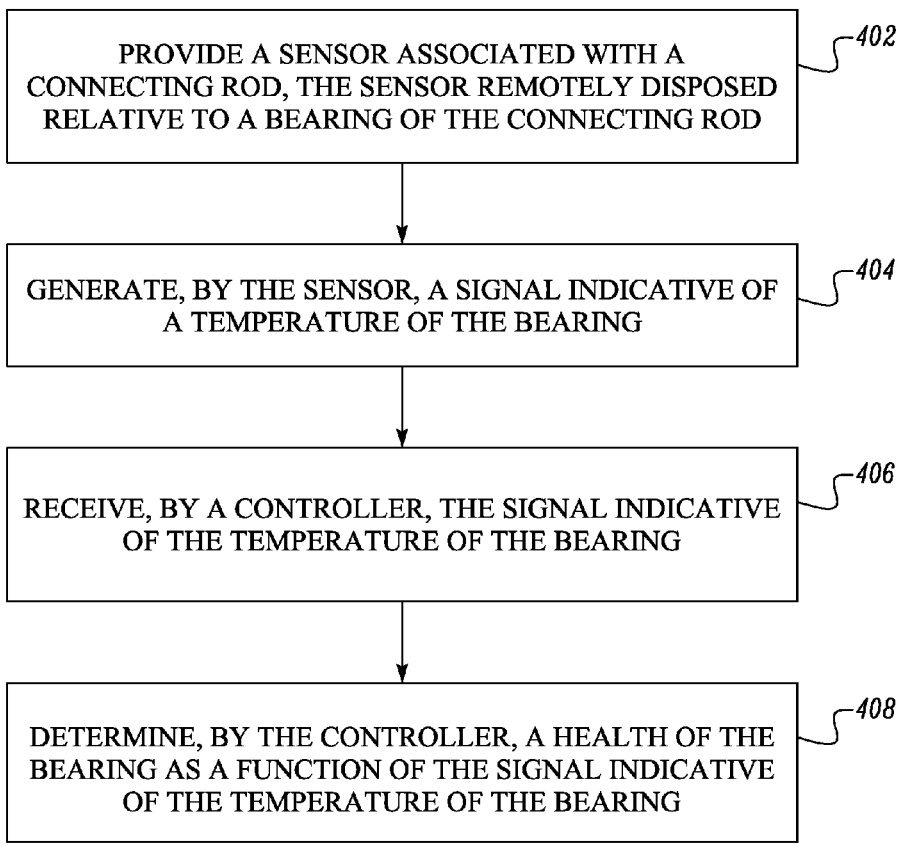
FIG. 4 illustrates a flowchart of an exemplary method of determining the health of the bearing.

FIG. 4 illustrates a flowchart of an exemplary method 400 for determining the health of the bearing 120 of the connecting rod 114. At step 402, the sensor 202 associated with the connecting rod 114 may be provided. More specifically, the sensor 202 may be positioned proximate to the fork end 116 of the connecting rod 114 and affixed on the engine housing 102.

At step 404, the sensor 202 may generate the signal indicative of the temperature of the bearing 120. At step 406, the controller 308 may receive the signal indicative of the temperature of the bearing 120 from the sensor 202. At step 408, the controller 308 may determine the health of the bearing as a function of the signal of the temperature of the bearing 120. In one embodiment, the controller 308 may compare the temperature of the bearing 120 with a predetermined threshold. Based on the comparison, the controller 308 may be configured to determine the health of the bearing 120. More specifically, the controller 308 may be configured to detect if the temperature of the bearing 120 exceeds the predetermined threshold, in order to determine an impending failure of the bearing 120. As explained earlier, in one embodiment, the predetermined threshold may be the average temperature of the bearings 120 of each of the plurality of other connecting rods 114. In another embodiment, the predetermined threshold may be the pre-calibrated dataset stored in the database 310 containing the set of allowable bearing temperature readings based on one or more parameters of the engine 100.

In other exemplary embodiments, the controller 308 may be configured to determine the health of the bearing 120 as a function of the rate of change of temperature of the bearing 120, or the second derivative of the temperature of the bearing 120. In another exemplary embodiment the controller 308 may be configured to determine the health of the bearing 308 with a predictive bearing failure, life, and/or wear model included in a controller 308 memory (not shown).

Accordingly, the controller 308 may display visual indications on the display device 312 to notify the operator of the determined health of the bearing 120. In one embodiment, prior to the detection of the tendency of the failure of the bearing 120, the controller 308 may display the notification indicative of the good health of the bearing 120 in the form of the relevant visual indication, like the text message or the colored icon. When the controller 308 may detect the tendency of the failure of the bearing 120, the controller 308 may change the notification displayed on the display device 312 to make the operator aware of the change in the health status of the bearing 120. For example, the contents of the text message or color of the icon may be appropriately changed.

Alternatively, the outputs provided by the system 300 may include remedial actions based on the detection of the tendency of the failure of the bearing 120. In one embodiment, on the detection of the impending failure of the bearing 120, the controller 308 may be configured to shut off the fuel supply to the engine 100 or the cylinder 108 associated with the respective bearing 120. In another embodiment, the controller 308 may be configured to restrict the power output of the engine 100 to the predetermined value until it may be possible to stop the engine 100 based on the completion of the ongoing task.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system for determining a health of a bearing associated with a connecting rod, the system comprising:
    a sensor associated with the connecting rod, the sensor affixed on an engine housing and remotely disposed relative to the bearing of the connecting rod, wherein the sensor is configured to generate a signal indicative of a temperature of the bearing; and
    a controller communicably coupled to the sensor, the controller configured to;
        receive the signal indicative of the temperature of the bearing; and
        determine the health of the bearing as a function of the signal of the temperature of the bearing.

2. The system of claim 1, wherein the controller is configured to compare the temperature of the bearing with a predetermined threshold, and determine the health of the bearing based on the comparison.

3. The system of claim 2, wherein the predetermined threshold further includes an average temperature of a plurality of other connecting rods.

4. The system of claim 2, wherein the predetermined threshold further includes a pre-calibrated dataset having one or more temperature values.

5. The system of claim 1, wherein the controller is further configured to detect a tendency of failure of the bearing based on the determination.

6. The system of claim 5, wherein the controller is further configured to shutdown a fuel supply to a cylinder based on the detection.

7. The system of claim 1 further comprising a display device communicably coupled to the controller, the display device configured to notify an operator of the determined health of the bearing.

8. The system of claim 1, wherein the sensor includes an infrared sensor.

9. The system of claim 1, wherein the sensor is disposed proximate to a fork end of the connecting rod.

10. A method for determining a health of a bearing associated with a connecting rod, the method comprising:
    providing a sensor associated with the connecting rod, the sensor affixed on an, engine housing and remotely disposed relative to the bearing of the connecting rod;
    generating, by the sensor, a signal indicative of a temperature of the bearing;
    receiving, by a controller, the signal indicative of the temperature of the bearing; and
    determining, by the controller, the health of the bearing as a function of the signal indicative of the temperature of the bearing.

11. The method of claim 10 further comprising:
    comparing, by the controller, the temperature of the bearing with a predetermined threshold; and
    determining, by the controller, the health of the bearing based on the comparison.

12. The method of claim 11, wherein the predetermined threshold further includes an average temperature of a plurality of other connecting rods.

13. The method of claim 11, wherein the predetermined threshold further includes a pre-calibrated dataset having one or more temperature values.

14. The method of claim 10 further comprising detecting a tendency of failure of the bearing based on the determination.

15. The method of claim 10 further comprising notifying an operator of the determined health of the bearing.

16. An engine housing comprising:
    a cylinder head;
    an engine block having a cylinder;
    a connecting rod associated with the cylinder, the connecting rod having a bearing;
    a sensor associated with the connecting rod, the sensor affixed on the engine housing and remotely disposed relative to the bearing of the connecting rod, wherein the sensor is configured to generate a signal indicative of a temperature of the bearing; and
    a controller communicably coupled to the sensor, the controller configured to:
        receive the signal indicative of the temperature of the bearing; and
        determine the health of the bearing as a function of the signal of the temperature of the bearing.

17. The engine housing of claim 16, wherein the controller is configured to compare the temperature of the bearing with a predetermined threshold, and determine the health of the bearing based on the comparison.

18. The engine housing of claim 17, wherein the predetermined threshold further includes an average temperature of a plurality of other connecting rods.

19. The engine housing of claim 17, wherein the predetermined threshold further includes a pre-calibrated dataset having one or more temperature values.

20. The engine housing of claim 16, wherein the controller is further configured to detect a tendency of failure of the bearing based on the determination.

* * * * *

UNITED STATES PATENT AND TRADEMARK OFFICE
CERTIFICATE OF CORRECTION

PATENT NO. : 8,966,967 B2  Page 1 of 1
APPLICATION NO. : 13/889486
DATED : March 3, 2015
INVENTOR(S) : Wiebrecht et al.

It is certified that error appears in the above-identified patent and that said Letters Patent is hereby corrected as shown below:

In the Claims:

Column 7, line 33 (Approx.), In claim 1, delete "to;" and insert -- to: --.

Signed and Sealed this
Second Day of February, 2016

Michelle K. Lee
*Director of the United States Patent and Trademark Office*